United States Patent [19]

Gise et al.

[11] 4,369,577

[45] Jan. 25, 1983

[54] FEED MECHANISM FOR FILAMENT TYPE VEGETATION TRIMMER

[75] Inventors: Glenn A. Gise, East New Market; Calvin M. Edleblute, Ridgely, both of Md.

[73] Assignee: Black & Decker Inc., Newark, Del.

[21] Appl. No.: 176,289

[22] Filed: Aug. 8, 1980

[51] Int. Cl.³ .......................................... A01D 50/00
[52] U.S. Cl. ...................................... 30/276; 56/12.7
[58] Field of Search ................... 56/12.7; 30/276, 347

[56] References Cited

U.S. PATENT DOCUMENTS

| | | | |
|---|---|---|---|
| 4,134,204 | 1/1979 | Perdue | 30/276 |
| 4,211,004 | 7/1980 | Woods | 30/276 |
| 4,285,128 | 8/1981 | Schnell | 30/276 |

*Primary Examiner*—Jimmy C. Peters

*Attorney, Agent, or Firm*—Edward D. Murphy; Walter Ottesen; Harold Weinstein

[57] ABSTRACT

A filament vegetation trimmer of the type wherein a stationary supply of filament is stored above the slinger head and fed out through a longitudinal feed passage for radial rotation with the slinger head is provided with an improved feed mechanism for selectively releasing incremental amounts of fresh filament from the storage site. The feed mechanism comprises a storage spool and indexer for permitting controlled quantities of the filament to be drawn from the spool under the centrifugal force exerted on the filament during operation. In the preferred embodiment, the feed control is deployed in an auxiliary handle and is configured to permit actuation by thumb pressure to enable an operator to release fresh filament without interruption of the trimming process.

13 Claims, 6 Drawing Figures

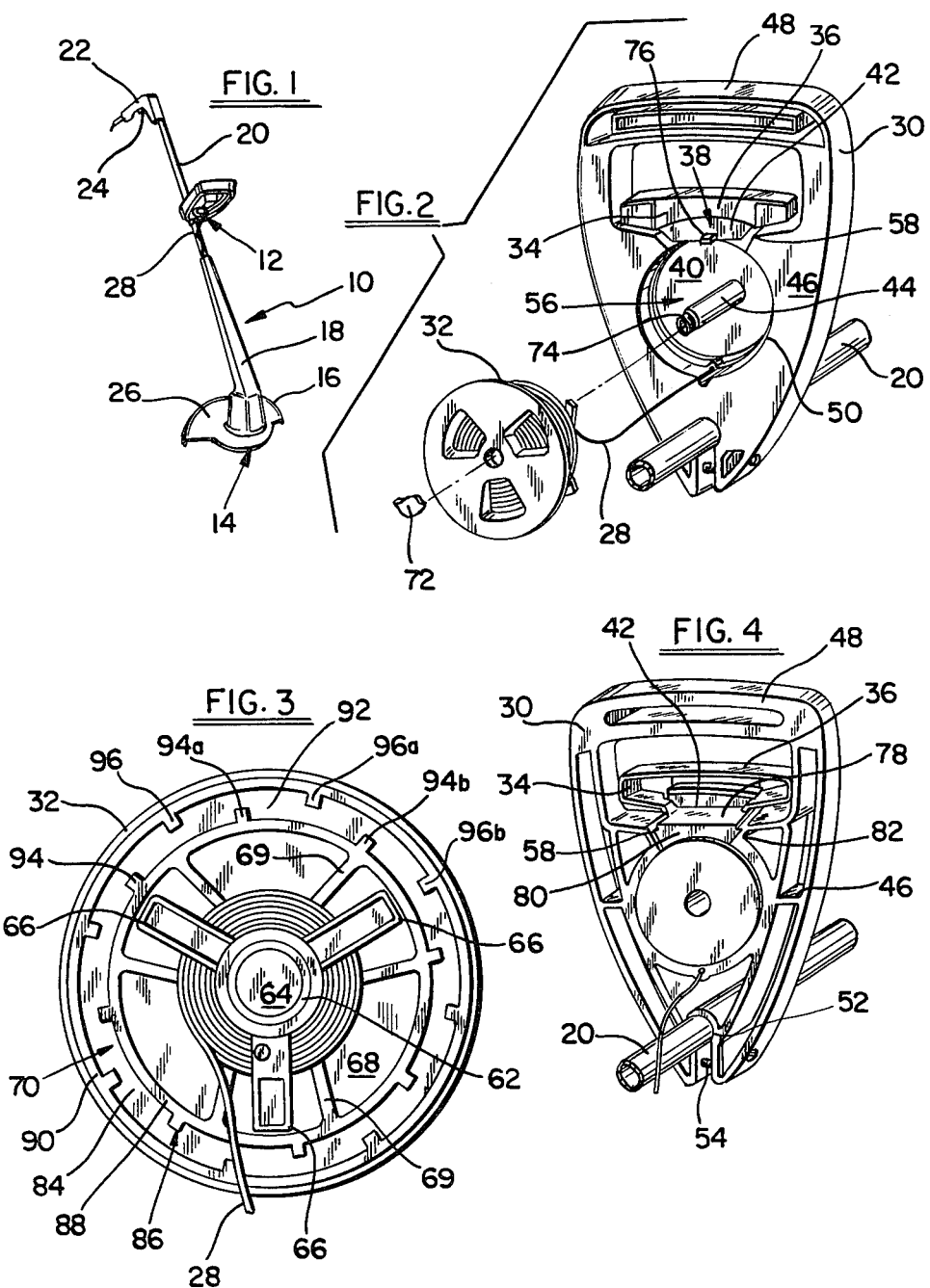

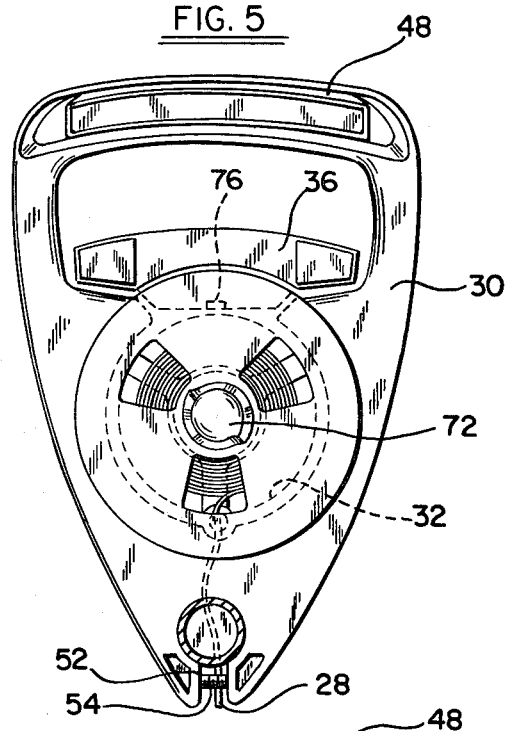
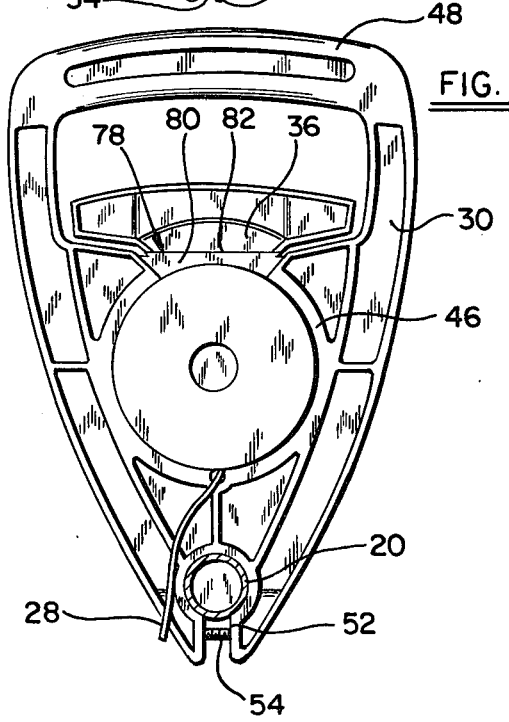

FEED MECHANISM FOR FILAMENT TYPE VEGETATION TRIMMER

FIELD OF THE INVENTION

The present invention pertains to filament type vegetation trimmers. More particularly, the present invention pertains to mechanisms for feeding out a supply of cutting filament for rotation by the slinger head of a filament trimmer. Even more particularly, the present invention pertains to means for feeding out a supply of cutting filament incrementally and without interruption of the trimming operation.

BACKGROUND OF THE INVENTION

Filament type vegetation trimmers wherein a filament is rotated rapidly in a radial plane to provide a cutting element are becoming increasingly popular as an effective alternative to bladed trimmers. However, as the filaments used are generally composed of plastic materials, they are susceptible to wear and breakage and new cutting lengths must be supplied during operation.

In the class of filament trimmers wherein the filament is attached in individual precut lengths and in certain types of trimmers wherein a continuous supply of filament is carried by the slinger head, replacement of worn filament requires interruption of the trimming operation. Moreover, many trimmer configurations require that the trimmer be turned upside down for access to the filament support cite or to the stored supply. These methods of filament replacement are, therefore, cumbersome and inconvenient.

Other classes of filament trimmers in which a supply of filament is carried by the slinger head include what is commonly known as a "bump feed" trimmer wherein bumping the slinger head on the ground releases a predetermined length of filament for rotation. Although this class of trimmer does not require inversion of the trimmer for filament release or replacement, bumping the trimmer with sufficient force to actuate the release mechanism can require substantial effort which detracts from its overall convenience and ease of operation. Also, repeated bumping of the trimming apparatus can accelerate wear of the device and, particularly, of the bearings.

A still further class of trimmer includes those wherein filament is wound about a spool in a predetermined pattern such that when the filament has been worn to a relatively short length, the centrifugal force exerted on the filament during the trimming operation causes a section of the pattern of wound filament to unwind to expose a fresh cutting length. Although trimmers of this type do not necessitate cumbersome handling of the device for filament replacement, they have other disadvantages in that excessive lengths of filament can be released and in that the operator does not exercise direct control of the feeding process. Moreover, all types of trimmers wherein the filament supply is carried by the slinger head waste power in unproductive rotation of the entire filament supply.

To overcome the aforementioned difficulties and inconveniences inherent in the above described varieties of trimmers, a new variety of trimmer has recently been developed wherein a stationary filament supply is stored above the slinger head and fed out through a longitudinal feed passage for radial rotation by the slinger head. Although this practical arrangement is efficient and enables convenient access to filament supply, controlled, incremental release of fresh line is often difficult to achieve and the operator is often required to interrupt his work to feed out new filament manually, as needed.

Therefore, significant improvements in the convenience and efficiency of trimmer operations would be achieved by providing a filament feed mechanism for use in connection with trimmers of the aforementioned, new variety wherein the filament supply is carried above the slinger head, operable to release lengths of fresh filament incrementally without waste, without interruption of the trimming operation and without exertion or inconvenience to the operator.

SUMMARY OF THE INVENTION

According to the present invention, a filament trimmer of the type wherein a stationary supply of filament is stored above the slinger head and fed out through a longitudinal feed passage for radial rotation with the slinger head is provided with a novel feed mechanism for incremental release of fresh filament by the slinger head.

The feed mechanism hereof comprises a spool for supporting a supply of filament in a wound condition thereon and a control means which coacts with means provided on the spool to control the unwinding of the spool.

During the trimming operation, the rotating filament is typically subjected to a centrifugal force of about 8 lbs., pulling the filament out from the slinger head. The control means and the means provided on the spool cooperate selectively to prevent the spool from unwinding or to permit the spool to unwind through a limited degree of rotation under the influence of the centrifugal force on the filament.

The control means hereof are preferably deployed in an auxiliary handle and the control means actuable by thumb pressure. In this manner, a controlled length of filament may be fed out for rotation by the slinger head conveniently and without interruption of the cutting operation.

It is therefore an object of the present invention to provide a means for selectively and incrementally feeding out a length of filament for rotation by the slinger head of a filament type vegetation trimmer having a stationary filament supply.

It is a further object of the present invention to achieve the foregoing by providing a spool of wound filament supply and control means with coacting release means operable to permit the spool to unwind a fixed amount to release a controlled amount of filament, under the influence of centrifugal force on the filament.

A further object of the present invention is to effect controlled feeding out of filament in a filament type vegetation trimmer by means located within easy reach of the operator which means may be actuated simply, without interruption of trimming operation.

It is still a further object of the present invention to provide a mechanism for feeding out filament incrementally which does not require bumping of the trimming device or other strenuous, physical effort.

It is still a further object of the present invention to provide a mechanism for feeding out filament wherein release of filament is selectively controlled by the operator and filament, released in incremental amounts to prevent waste thereof.

Other objects and advantages of the present invention will be readily apparent when the following specificaton is read in combination with the drawings in which:

DESCRIPTION OF THE DRAWINGS

FIG. 1 is a perspective view of a filament type vegetation trimmer equipped with the feed mechanism hereof, shown mounted in an auxiliary handle.

FIG. 2 is an exploded front perspective view of the feed mechanism hereof, and the auxiliary handle.

FIG. 3 is a rear plan view of the spool portion of the feed mechanism.

FIG. 4 is a rear view of the auxiliary handle with the feed mechanism hereof mounted therein.

FIG. 5 is a front elevational view, partially in phantom of the auxiliary handle and feed mechanism hereof.

FIG. 6 is a rear elevational view of the auxiliary handle and feed mechanism hereof.

DETAILED DESCRIPTION OF THE PREFERRED EMBODIMENT

Now and with reference to FIG. 1 there is shown generally at 10 a filament type vegetation trimmer equipped with the novel feed mechanism 12 hereof. The trimmer 10 in the embodiment shown generally comprises a slinger head 14, a prime mover housing 16, a housing extension 18, a wand 20, a handle 22 and an On/Off switch 24 for operation thereof, conveniently deployed on the handle 22. A shield 26 is removably mounted on the prime mover housing 16 to protect the operator for debris thrown during the trimming operation. The shield 26 is further provided with a cutting element proximate the outer edge thereof for cutting off excessive lengths of filaments. As the embodiment shown is operated by an electric motor, a power cord is provided which extends through the housing extension and terminates in a connector for connection with an electric power source. It is to be appreciated that the novel feed mechanism thereof may be used succesfully with trimmer devices incorporating numerous configurations and other varieties of prime mover means, such as gasoline engine or batteries, and the particular of configuration of the unit and the type of prime mover means shown are not considered critical hereto, but are, rather, illustrative of only one type of filament trimmer with which the present invention may be used to advantage.

The feed mechanism 12 hereof is particularly directed toward and is most advantageously applied to trimmer devices of the type having a rotary power output means and a slinger head 14 wherein a supply of cutting filament, herein shown at 28 is stored above the slinger head 14 and cutting lengths fed out through a longitudinal passageway for radial rotation with the slinger head.

The novel feed mechanism 12 hereof is operable to release a supply of fresh filament 28 to the slinger head 14, incrementally, at the direction of the operator. In the preferred embodiment, the feed mechanism 12 is deployed within an auxiliary handle 30 of the general type which is, according to conventional practice, adjustably mounted on the wand 20 (between the housing 16 and the handle 22 as shown in FIG. 1) to facilitate handling and maneuvering of the trimmer during use. When deployed in the auxiliary handle 30, the feed mechanism 12 hereof will be within easy reach of the operator to permit actuation of said mechanism to feed out filament without interruption of the trimming operation. However, it is to be appreciated that although this arrangement is particularly advantageous, the feed mechanism 12 hereof may also be adapted to mount independently along the handle 22 or wand 20, or housing extension 18 at other points within convenient reach of the operator.

FIG. 2 provides an exploded view of the preferred embodiment of the filament feed mechanism 12 mounted in the auxiliary handle 30. The mechanism 12 essentially comprises a replaceable spool 32 (as shown in FIG. 2) and a control means 34. The control means 34 comprises an integrally formed member, having a manually-manipulatable control member or control bar 36, detention means 38, a backing portion 40 and interconnecting means 42, interposed between said detention means 38 and said backing portion. The backing portion 40 is provided with a mounting shaft 44 which extends generally perpendicularly from said backing portion.

The auxiliary handle 30 is particularly adapted, in accordance herewith, to mount the feed mechanism therewithin, and, in the preferred embodiment, the control means 34 of said mechanism 12 is formed integrally therewith. More particularly, the auxiliary handle 30 hereof comprises an integrally formed body portion 46 and a hand grip portion or handgrasp 48 and is provided with recess 50 in its body portion 46 for receiving the spool 32, which recess forms the backing portion 40 of the control means 34. The auxiliary handle 30 is further provided with a keyslot 52 by which means said auxiliary handle 30 is mounted on the trimmer by fastening means 54 such as a screw or rivet assembly.

The recess 50 in the auxiliary handle body 46 defines a well 56 for receiving the spool 32, the backing portion 40 providing a seat therefore.

The auxiliary handle 30 is provided with a cut-out portion 58 which extends through the well 56 to the backing portion 40 thereof and opening out toward the handgrasp 48. In this manner, when the control means 34 is positioned within the auxiliary handle in accordance herewith, interconnecting means 42 will extend up through said recess 58, through said body portion 46 and said control bar will be conveniently positioned opposite said handgrasp 48.

The spool 32 comprises a cylindrical spindle 62 about which the stored supply of filament 28 is wound. The cylindrical spindle is provided with a bore 64 therethrough, dimensioned to receive the mounting shaft 44 on the backing portion 40 of the control means therethrough. The spool further comprises a plurality of first filament supports 66 extending radially from a first end of the spindle 62 which supports 66 contain the wound filament in position thereon. An end plate 68 extends radially from the spindle at the second end thereof, opposite supports 66, said plate carrying a plurality of second filament supports 69 thereon for retaining the filament in position around the spindle 62. The spool 32 hereof is additionally provided with indexing means denoted generally at 70 which means coact with the control means 34 to provide indexed release means whereby the spool is selectively restrained or permitted to unwind therough a fixed degree of rotation.

The spool 32 is inserted into the well 56 in the auxiliary handle 30 such that said first filament supports 66 are seated against the backing portion 40. The mounting shaft 44, extending up from the backing portion 40 is received through the bore 64 in the spindle 62 and the spool 32 is then secured rotatably in position by means of a cap 72 which is adapted to fit over the end of the mounting shaft 44 to retain the spool thereon. The end of the shaft 44 may be provided with threading 74 and the cap 72, with complementary, internal threading (not shown) to permit the cap to be screwed onto the shaft 44.

When positioned against said backing portion 40 within said well 56, the end plate 68 of the spool 32 opposes the detention means 38 of the control means 34.

The detention means 38 comprises a flange or detent 76, positioned on the control means 34 to extend toward and generally perpendicular to said end plate 68, and shiftable between first and second positions by actuation of said control bar 36.

More particularly, the detent 76 hereof is deployed on the lower portion of the control bar 36. The interconnecting means 42 comprises a first element 78 which extends rearwardly from the control bar 36, generally perpendicular to its axis, and a second element 80 which interconnects said first element 78 with said backing portion 40. The detent 76 is positioned on said control bar 36, and extends generally perpendicularly therefrom.

The control member 34 is constructed from resiliently yieldable material such that the first and second elements 78, 80 of connective means 44 function as a flexible hinge, referred to as a "living" hinge by those skilled in the art to which the invention pertains (denoted generally at 82) whereby the control bar 36 may be urged back by manual pressure thereon, will flex slightly with respect to the handle, and will return to its original position when the pressure is released.

It is to be appreciated that when the control bar 36 is urged back, away from the spool end plate, the living hinge 82, imparts a vertical component to the responsive movement of said first element 78 of said interconnecting means 42, resulting in a lifting of said control bar 36 and of the detent 76 positioned thereon. Similarly, on release of the control bar 36 the living hinge 82 of said interconnecting means 42 will cause said control bar and the detent 76 thereon to return to their respective vertical positions prior to actuation of the control bar. In this manner, the control bar is operable to effect upward movement of the detent for purposes which will be explained more fully hereinbelow.

The end plate 68 of the spool 32 is provided with means which coact with said control means 34 to define the indexed release means for selectively retaining said spool 32 in a fixed position or permitting said spool 32 to unwind through a predetermined degree of rotation.

As best seen in FIG. 3, the end plate 68 comprises an endwall 84 which extends radially from the spindle 62. Locking means 86 are provided about the perimeter of said end wall, and a plurality of upstanding walls, defining said second filament support 69 extend radially from said spindle to said locking means 86. The locking means 86 comprises a first inner, wall 88 which extends upwardly from the end wall 84, to define an inner circumference therearound. A second wall 90 is provided about the outer circumference of the endwall 84, proximate the edge thereof, substantially parallel to and coextensive with said inner wall 88, to form a circumferential channel 92 therewith. The inner 88 and outer 90 walls are provided with opposed rows of equally spaced, staggered teeth 94a, b, c, 96a, b, c, respectively, which extend radially into the channel 92.

When the spool 32 is mounted within the well 56 in the auxiliary handle 30 in accordance herewith and seated against the backing 40 of the control member 34, the detent 76 extends into the channel 92. It is intended that the detent be configured and positioned such that when at rest the detent 76 will ride along the inner wall 88 of the channel 92, to abut inner teeth 94 and thereby to prevent the spool 32 from unwinding. The configuration and position of the detent 76 further provide that the detent 76, when lifted by actuation of the control bar 36, under influence of living hinge 84, will be brought into alignment with said outer teeth 96. When the detent is lifted in accordance herewith, the spool 32 is permitted to unwind until the detent encounters one of said outer teeth 96. Release of said detent returns it to its original position along said inner wall 88 and further unwinding of the spool 32 is permitted until said detent 76 encounters the next inner tooth 94.

When the trimmer 10 is in use, the rapid rotation of the filament 28 results in a substantial centrifugal force, which is exerted on the filament and which tends to pull the filament out from the slinger head. Typically, the centrifugal force exerted on the filament is of approximately 8 pounds. Clearly, if the spool 32 were not restrained, the centrifugal force drawing the filament 28 out from the slinger head 14 would pull the filament from the stationary spool causing it to unwind rapidly.

However, and as hereinabove described, the detent 76 and the respective ratchet teeth of the indexing means 86 on the spool 32 coact selectively (and sequentially) to prevent unwinding or to permit controlled unwinding of the spool 32 under the centrifugal force exerted on the filament 28.

More particularly, in its rest position, the detent 76 abuts an inner tooth, such as 94a and, so prevents the spool 32 from unwinding under the centrifugal force on the filament. When it is desired to release fresh filament, the control bar 36 is depressed to bring the detent 76 out of engagement with the inner tooth 94a and to permit the spool 32 to unwind under the centrifugal force on the filament 28.

The degree to which the spool unwinds under the influence of the centrifugal force is now limited by tooth 96a to prevent excessive and uncontrolled unwinding. When said detent 76 is in its lifted position it rides along the outer wall 90 of the plate 84. Thus as the spool 32 unwinds, outer tooth 96a will be brought into abutting engagement with the raised detent 76. It is to be appreciated that the spool generally unwinds very quickly due to the substantial centrifugal force exerted on the filament 28 and that the unwinding will generally be interrupted by the engagement of the detent 76 with outer tooth 96a before the detent 76 is returned to its position along the inner wall 88 by release of the control bar 36. When the control bar 36 is released, the detent 76 returns to its rest position along the inner wall 88, thereby allowing the spool 32 to continue unwinding under the centrifugal force on the filament 28 until the next inner tooth reaches and is abuttingly engaged by the detent, thereby once more, preventing further unwinding of the spool 32.

It is to be noted that the deployment of the control bar 36 opposite and adjacent to the handgrasp 48 of the auxiliary handle 30 (as shown in FIG. 2) enables the control bar 36 to be depressed, and the control means 34 thereby actuated, by simple thumb pressure. Thus, filament line may be advanced in accordance herewith, easily and quickly and without interruption of the trimming operation.

Further, the release of filament herein is controlled and incremental and within the control of the operator.

It is further to be understood that the indexed feeding mechanism hereof is susceptible to numerous variations and alterations all falling within the scope and spirit of the appended claims.

What is claimed is:

1. In a filament type vegetation trimmer of the variety having:
   a housing,
   a wand,
   a handle mounted on said wand,
   a prime mover mounted in said housing and having a rotary power output means,
   a slinger head, drivingly coupled with said rotary power output means,
   a stationary supply of filament, and
   means for guiding a free end of said filament through a longitudinal passage to said slinger head, for radial rotation therewith,
   a feed mechanism for releasing filament to said slinger head, said feed mechanism being positioned on said wand and comprising:
   spool means for storing said filament,
   indexing means associated with said spool means; and
   control means which coact with said indexing means to limit the rotation of said spool, said control means being actuable to permit said spool to unwind a limited amount and a controlled amount of filament to be drawn therefrom;
   wherein said indexing means comprises first and second rows of opposed, staggered teeth positioned around the circumference of said spool, and wherein said control means comprises a detent, configured to engage said first row of teeth and a control bar, operable to bring said detent into engagement with said second row of teeth; and
   wherein said detent is deployed on said control bar, and wherein actuation of said control bar effects movement of said detent between said rows of teeth by means of a living hinge element.

2. In a filament type vegetation trimmer of the variety having:
   a housing,
   a wand extending from the housing,
   a handle mounted on said wand,
   an auxiliary handle member mounted on said wand between the housing and the handle,
   a rotary power output means mounted in said housing,
   a slinger head, drivingly coupled with said rotary power output means,
   a stationary supply of filament,
   means for guiding a free end of said filament through a longitudinal passage to said slinger head, for conjoint rotation therewith, and
   a feed mechanism for releasing filament to said slinger head, said feed mechanism being mounted on said auxiliary handle member and comprising:
   spool means in the auxiliary handle for storing said filament,
   indexing means associated with said spool means, and
   control means formed integrally with the auxiliary handle and coacting with said indexing means to limit the rotation of said spool, said control means being actuable to permit said spool to unwind a limited amount, whereby a controlled amount of filament may be drawn from the spool.

3. The feed mechanism of claim 2, wherein said indexing means comprises first and second rows of opposed, staggered teeth positioned around the circumference of said spool, one row extending radially of the other, and wherein said control means comprises a detent, configured to engage said first row of teeth, and a control bar operable to bring said detent into engagement with said second row of teeth.

4. The feed mechanism of claim 3, wherein said control means is positioned and configured for convenient actuation by an operator's thumb.

5. In a filament type vegetation trimmer of the variety having:
   a housing,
   a wand,
   a handle, mounted on said wand,
   an auxiliary handle member mounted on said wand,
   a prime mover mounted in said housing and having a rotary power output means,
   a slinger head, drivingly coupled with said rotary power output means,
   a stationary supply of filament, and
   means for guiding a free end of said filament through a longitudinal passage to said slinger head, for radial rotation therewith,
   a feed mechanism for releasing filament to said slinger head, said feed mechanism being positioned on said auxiliary handle member and comprising:
   spool means for storing said filament,
   indexing means associated with said spool means, and
   control means which coact with said indexing means to limit the rotation of said spool, said control means being actuable to permit said spool to unwind a limited amount and a controlled amount of filament to be drawn therefrom;
   wherein said indexing means comprises first and second rows of opposed, staggered teeth positioned around the circumference of said spool, and wherein said control means comprises a detent, configured to engage said first row of teeth, and a control bar operable to bring said detent into engagement with said second row of teeth; and
   wherein said detent is deployed on said control bar, and wherein actuation of said control bar effects movement of said detent between said rows of teeth by means of a living hinge element.

6. A filament type vegetation trimmer comprising:
   a wand;
   a handle;
   a housing;
   a prime mover having a rotary output means and mounted in said housing;
   a slinger head, drivingly coupled with said rotary output means;
   means for receiving a supply of filament on said wand;
   means for guiding a cutting end of filament through a longitudinal passage for radial rotation by said slinger head; and
   a feed mechanism for releasing controlled amounts of filament through said guide means, said feed mechanism having,
   indexing means associated with said means for receiving filament, and
   means including a control bar coacting with said indexing means to permit selective control of amounts of filament to be drawn from said filament receiving means,
   wherein a detent is deployed on said control bar, and wherein actuation of said control bar effects movement of said detent for cooperation with said indexing means by means of a living hinge element.

7. A filament type vegetation trimmer comprising:
a wand;
a handle on one end of the wand,
a housing on the other end of the wand,
a prime mover, mounted in said housing and having a rotary output shaft;
a slinger head drivingly coupled with said rotary output shaft;
means for guiding a cutting end of filament through a longitudinal passage to said slinger head for radial rotation therewith;
an auxiliary handle member, mounted on said wand between the handle and housing; and
a feed mechanism for releasing controlled amounts of filament for rotation by said slinger head, said feed mechanism comprising:
means in the auxiliary handle for receiving a supply of filament,
indexing means associated with said means for receiving a supply of filament, the indexing means comprising first and second rows of circumferentially-staggered ratchet teeth, and
control means disposed on said auxiliary handle and sequentially coacting with said ratchet teeth to permit controlled amounts of filament to be drawn from said filament receiving means at the discretion of the operator, said control means being configured and positioned for convenient actuation by an operator's thumb, and said control means including a detent carried by a control bar formed integrally with the auxiliary handle and adapted to be flexed relative thereto.

8. An auxiliary handle for use in combination with a filament type vegetation trimmer of the variety having:
a wand;
a housing;
a prime mover, mounted in said housing and having a rotary output shaft;
a slinger head, drivingly coupled with said rotary output shaft, and
means for guiding a free end of filament through a longitudinal passage to said slinger head for radial rotation therewith, and
a handle, mountable on said wand and having a filament feed mechanism disposed therein, said filament feed mechanism comprising:
means for receiving a supply of filament;
indexing means associated with said means for receiving filament; and
control means which coact with said indexing means to permit controlled amounts of filament to be drawn from said filament receiving means;
wherein said control means comprises a detent, configured and positioned to engage said first row of teeth deployed on said spool, and a control bar operable to bring said detent into engagement with said second row of teeth; and
wherein said detent is deployed on said control bar, and wherein actuation of said control bar effects movement of said detent between said rows of teeth by means of a living hinge element.

9. An auxiliary handle for use in combination with a filament type vegetation trimmer of the variety having:
a wand;
a housing;
a prime mover, mounted in said housing and having a rotary output shaft;
a slinger head, drivingly coupled with said rotary output shaft; and
means for guiding a free end of filament through a longitudinal path to said slinger head for radial rotation therewith, said auxiliary handle being mountable on said wand and having a filament feed mechanism disposed therein, said filament feed mechanism comprising:
a spool;
indexing means associated with said spool comprising first and second rows of opposed, staggered teeth, positioned around a circumference of said spool;
control means which coact with said indexing means to permit controlled amounts of filament to be drawn from said spool, and which comprises a detent, configured and positioned to engage said first row of teeth deployed on said spool and a control bar, operable to bring said detent into engagement with said second row of teeth; and
wherein said detent is deployed on said control bar, and wherein actuation of said control bar effects movement of said detent between said rows of teeth by means of a living hinge element.

10. In a filament vegetation trimmer of the type having:
a wand;
a housing;
a prime mover, mounted in said housing and having a rotary output shaft;
a slinger head, drivingly coupled with said rotary output shaft, and
means for guiding a free end of filament through a longitudinal passage to said slinger head for conjoint rotation therewith,
the sub-combination which comprises an auxiliary control handle adjustably mounted on the wand of the trimmer to suit the convenience of the operator, a reservoir of filament replaceably contained within said auxiliary control handle, and manually manipulatable means associated with the auxiliary control handle for selectively controlling the feeding of the line out of its reservoir.

11. In a flexible line trimmer of the character described, the combination of a handle formed from a suitable material and including a hand grip portion, a replaceable spool mounted on the handle, the spool having respective ratchet teeth associated therewith, a manually-manipulatable member integrally formed with the handle and connected thereto by a living hinge, whereby the control member may flex with respect to the handle, and detent means carried by the control member and sequentially cooperating with the respective ratchet teeth to permit the spool to unwind by a limited amount, thereby facilitating the feeding of a controlled amount of line at the convenience of the operator during use of the trimmer.

12. In a flexible line trimmer, the combination of a handle having a hand grip portion engaged by the operator, the handle further having a recess formed therein substantially adjacent to the hand grip, a replaceable line spool received within the recess substantially adjacent to the hand grip, manually-manipulatable means for retaining the spool within the recess in the handle, thereby facilitating the convenient replacement of the spool, the spool having respective ratchet teeth associated therewith, a manually-manipulatable movable control member carried by the handle adjacent to the hand grip portion thereof, whereby the operator may occasionally engage the control member without substantially removing his hand from the hand grip, and detent means carried by the control member and sequentially cooperating with the respective ratchet teeth on the spool, thereby permitting the spool to unwind by a limited amount, and thereby facilitating the feeding of a controlled amount of line at the convenience of the operator during use of the trimmer.

13. In a flexible line trimmer of the character described, the combination of a handle having a hand grip portion and further having a recess formed therein, a line spool replaceably mounted in the recess and retained therein, the spool having respective ratchet teeth associated therewith, a manually-manipulatable control bar integrally formed with the handle and connected thereto by a living hinge, whereby the control bar may flex with respect to the handle, the control bar being disposed adjacent to the hand grip portion of the handle and being adapted to be actuated by the operator's thumb, and detent means carried by the control bar and sequentially cooperating with the respective ratchet teeth to permit the spool to unwind by a limited amount, thereby facilitating the feeding of a controlled amount of line at the convenience of the operator during use of the trimmer and while the operator maintains control thereof.

* * * * *